United States Patent
Carlson et al.

(10) Patent No.: US 6,821,110 B2
(45) Date of Patent: Nov. 23, 2004

(54) APPARATUS FOR MOLDING WITH HOT MELT ADHESIVES

(75) Inventors: Kurt Carlson, Reno, NV (US); Reimer Hanson, Reno, NV (US); Wilhelm Thilo, Reno, NV (US)

(73) Assignee: The Cavist Corporation, Reno, NV (US)

( * ) Notice: Subject to any disclaimer, the term of this patent is extended or adjusted under 35 U.S.C. 154(b) by 0 days.

(21) Appl. No.: 10/202,433

(22) Filed: Jul. 23, 2002

(65) Prior Publication Data

US 2004/0018269 A1 Jan. 29, 2004

(51) Int. Cl.[7] .............................................. B29C 45/03
(52) U.S. Cl. ........................ 425/542; 425/574; 425/589; 425/590
(58) Field of Search ................................ 425/542, 589, 425/590, 144, 574

(56) References Cited

U.S. PATENT DOCUMENTS

| | | | |
|---|---|---|---|
| 3,156,014 A | * | 11/1964 | Wenger |
| 3,752,623 A | * | 8/1973 | Sinn et al. |
| 5,201,420 A | | 4/1993 | Thaler et al. |
| 5,318,435 A | * | 6/1994 | Brown et al. |
| 5,792,493 A | | 8/1998 | Gellert |
| 5,945,139 A | | 8/1999 | Price et al. |

FOREIGN PATENT DOCUMENTS

| | | |
|---|---|---|
| DE | 198 20 871 A1 | 10/1999 |
| EP | 0718234 A2 | 6/1996 |

OTHER PUBLICATIONS

Cincinnati Milacron, "T–Line Toggle Injection Molding Machines Publication PM–198(1/82),".
Cincinnati Milacron, "Hydraulic Injection Molding Machinery Publication PM–172,".

* cited by examiner

*Primary Examiner*—Tim Heitbrink
(74) *Attorney, Agent, or Firm*—Ian F. Burns

(57) ABSTRACT

This invention consists of a new cost effective injection molding apparatus for molding with hot melt adhesives and other Polyamide materials. Manufactured from standard tubing components in a double "L" or "C" design, it has fewer moving parts than other molding machines therefore requiring less maintenance. It is specifically designed to not require the use of temperature limiting and maintenance prone heated hoses for transport of melted material or sliding injection nozzles for engagement into mold-set by utilizing a substantially fixed injection nozzle. It incorporates a sell-draining melt reservoir with single-side mounting to allow for heat expansion and has very short material transfer distance from reservoir to mold-set. It can utilize permanent nozzle engagement into the mold-set to simplify molding operation and reduce cost. It incorporates several safety features to protect operators against injuries.

39 Claims, 2 Drawing Sheets

APPARATUS FOR MOLDING WITH HOT MELT ADHESIVES

FIELD OF INVENTION

This invention relates to an Premelt Polyamide molding apparatus, which is primarily used for insert molding. More specifically, it is directed to a molding apparatus for use with hot melt adhesives such as dimer acid based polyamide resins. Such raw materials can be used for molding at relatively low pressures, thus allowing encapsulation of fragile components.

BACKGROUND FOR THE INVENTION

Molding machines for insert molding with hot melt adhesives are known. Most existing molding machines used for molding with hot melt adhesives utilize melting and feeding systems adapted from hot melt application equipment. They generally fall in two main categories namely small machines for prototype molding with small reservoir capacities below 500 ml and larger production machines with larger melt reservoirs above 2 liters. The prototype machines often use air pressure to push out the melted material and are typically designed with an injection nozzle that is fixed on the reservoir. Therefore the reservoir or the mold-set must move in order for the nozzle to engage into the mold-set. The production machines typically utilize a pumping device and a heated hose to transport the melted material to the nozzle. This nozzle is typically mounted on a sliding device, allowing it to engage into the mold-set. These molding machines typically utilize standard hot melt adhesive melting units combined with a mold clamp where a heated hose is used to transport the melted raw material to a sliding injection nozzle and finally to the mold set. Such machines are expensive to manufacture and require maintenance or replacement of the heated hoses on a frequent basis. These hoses are prone to blockage as the material chars inside. The hoses also limit the maximum molding temperatures with such Polyamide materials and are a source of substantial energy loss. Sometimes it is desirable to operate at temperatures above the hose limitation in order to obtain certain flow characteristics from the raw materials in the mold-set. Specifically the harder polyamide materials tend to have heat requirements above that of heated hoses.

SUMMARY OF THE INVENTION

Accordingly the objectives of this invention are to provide an apparatus for molding with Polyamide materials that:
provides a more cost effective molding machine for high volume production;
reduces the maintenance requirements for such machines;
reduces the energy loss typically associated with such molding equipment;
reduces cycle time for molding operations with a new injection nozzle engagement system;
reduces degradation of material due to short transfer distance and accurate temperature control;
provides a better work area for the operator, and
simplifies changeover from one type of material to another.

Other objectives of the invention will become apparent from time to time throughout the specification and claims as hereinafter related.

To achieve such improvements, this invention consists of a cost-effective injection molding apparatus for molding with hot melt adhesives and other Polyamide materials. It is manufactured from standard, inexpensive tubing components in a simple design, it has fewer moving parts than other molding machines. It is specifically designed to not require the use of temperature limiting heated hoses for transport of melted material. It does not require sliding injection nozzles for engagement into mold-set. Instead it utilizes a very compact layout with a substantially fixed injection nozzle. These features result in very low maintenance requirement for the invention. It incorporates a large, self-draining melt reservoir with single-side mounting to allow for heat expansion and has very short material transfer distance from reservoir to mold-set. It can utilize permanent nozzle engagement into the mold-set to simplify molding operation and reduce cost further. It incorporates several safety features to protect operators against injuries and has a large work area around the mold-set.

BRIEF DESCRIPTION OF DRAWINGS

The manner in which these objectives and other desirable characteristics can be obtained are indicated in the following description and the attached drawings in which.

DISCLOSURE OF THE INVENTION

Figure 1:
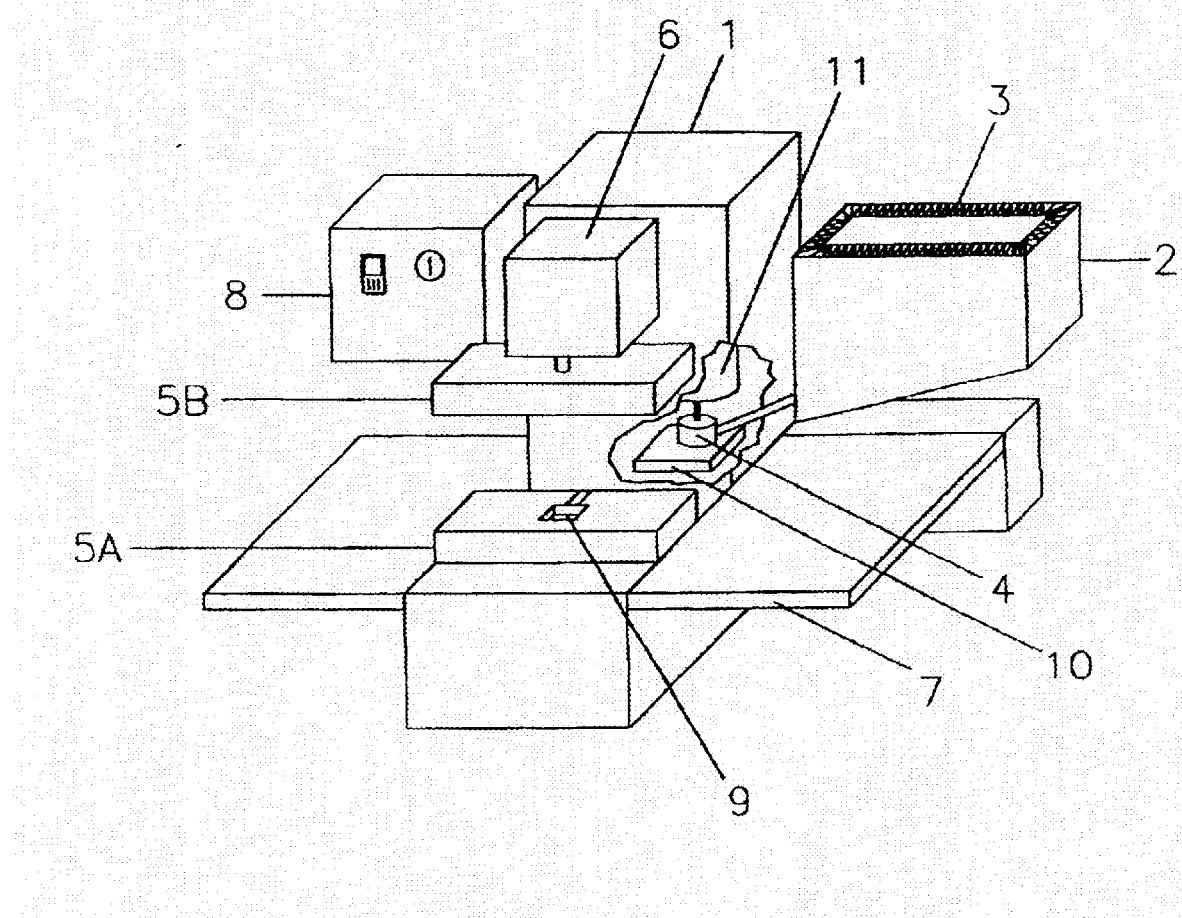
FIG. 1 is a general layout of the invention showing structural frame, melt reservoir, pump, mold halves and controller box.
Figure 2:
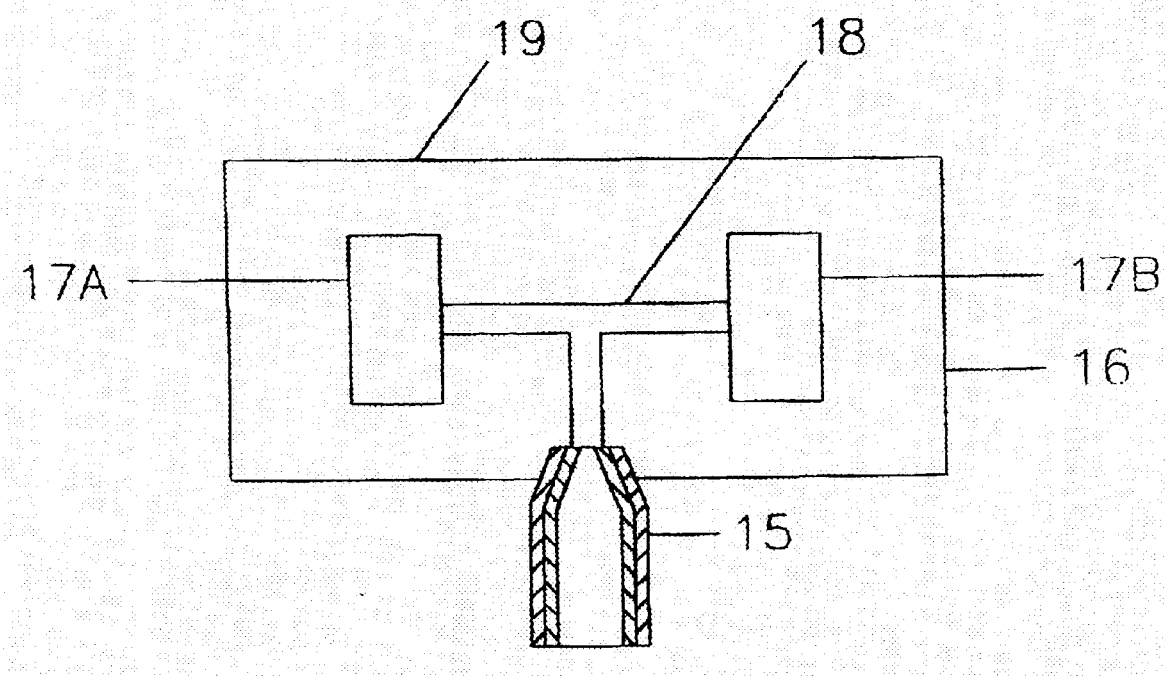
FIG. 2 shows the injection nozzle engagement into mold-set.

The preferred embodiment of the invention is illustrated in FIGS. 1 and 2. This molding apparatus for molding with Polyamide materials is designed for high productivity at low equipment and maintenance cost. It comprises a large melt reservoir (2) for full production scale molding operation without utilizing a heated hose to convey the molten material from the reservoir (2) to the mold-set (5A & 5B). Such heated hoses are prone to failure and thus costly to operate. Because of the relatively high viscosity and temperature of the melted raw materials, the energy losses in these hoses are substantial. The invention utilizes a compact layout where the injection nozzle (15) is mounted on a pump manifold (10) adjacent to the pump (4), preferably a gear pump, and where this pump (4) is mounted close to the melt reservoir (2). The melt reservoir (2) is designed to be self-draining for easier maintenance and is mounted in one side only to allow for expansion and contraction as result of temperature variations. Accurate temperature control (8) in different zones from the reservoir (2) to the injection nozzle (15) ensures correct temperature of the materials and thereby minimizes degradation. Such accurate temperature control can be achieved by utilizing several heating elements and temperature sensing devices that are located at various places at the melt reservoir (2) and pump manifold (10). The reservoir (2) is self-draining with easy cleaning access, which simplifies changeover from one type or color of raw material to another. A very short distance from the reservoir (2), where the raw materials are melted, to the mold-set (5A & 5B) simplifies the temperature management (8) and results in better performance from the raw materials. The physical properties of components (9 & 17A & 17B) molded from polyamide resins are dependent on the molding temperature, which must be accurately controlled. In general these materials exhibit stronger adhesive properties when applied at temperatures in the higher end of their molding range. The present invention is designed to function without a heated hose and utilizes an adjustable injection nozzle (15), which can be mounted adjacent to the pump manifold (10). This allows higher molding temperatures as the hose is typically the temperature limitation on existing machines. The adjustable nozzle (15) is located close to the reservoir (2) to minimize degradation of the raw material and the nozzle (15) engagement into the mold-set (16 & 19) is fixed and requires no sliding of nozzle during molding operations.

The nozzle (15) engagement is adjustable to allow for installation of different mold-sets (16 & 19) and is designed for easy mold-set (16 & 19) installation and to minimize heat loss during molding. This adjustment can be achieved by mounting the pump (4) and injection nozzle (15) in a manner that allows adjustment of nozzle location and by utilizing different types of nozzles. The invention has far fewer moving components than existing molding machines and therefore requires less maintenance. The invention utilizes a double "L" or "C" shaped frame (1), which provides for both structural rigidity to support the mold clamping device (6) and also for mounting of all apparatus main components. This can include the melt reservoir (2), the controller box (8), the work area (7) and the mold-set (5A & 5b). This frame (1) design utilizes inexpensive, standard tubing components that are readily available and can be sized to withstand the forces from the mold clamp. The pump (4) and motor (11) assembly can be mounted inside the main structural member resulting in a safe and compact molding apparatus for high production. This can be designed as a simple slide-in system. Another variation of the apparatus may have sliding lower mold halves (5A) that engages with the fixed injection nozzle (15), which makes it suitable for shuttle table or rotary table operation. Such arrangement will increase productivity further and offer additional space and work area (7) for the operator. Either design can be mounted on a bench-top, integrated into a workbench or mounted in a stand-alone frame. This cost effective molding apparatus is designed to allow for a clear and open work area (7) for the operator, which is important as insert molding often is used for cable assemblies. It incorporates various measures to protect the operator against burn and injury such as safety button systems, insulation (3) and heat shields. It is furthermore designed to be very quiet and clean and not require any hydraulic system for operation of any components. A pneumatically operated mold clamping device (6) may incorporate features such as low initial force and only apply full pneumatic pressure when the mold-set (5A & 5B) is substantially closed to protect further against operator injury.

Industrial Applicability

This simple insert molding apparatus will allow the industry to have a cost effective way to use hot melt adhesives for molding. This offers an alternative to forming components using toxic epoxy materials. The low molding pressures that can be used with these raw materials allow for over-molding or encapsulation of fragile components, such as electronic circuit boards or thin strands of wire. This simplifies the production of final parts and reduces the number of production steps in manufacturing operations. Molding with polyamide adhesives has technical as well as operator health advantages, as no toxic fumes are released, and this invention makes such low pressure molding a commercially competitive technology. Molding with such thermoplastic materials is known but the equipment available is rarely designed for this service but rather adapted from hot melt application equipment. This invention is an injection molding apparatus, which is designed specifically for molding at relatively low pressures with thermoplastic materials. The invention comprises a heated melt reservoir designed for melting of these molding materials and feeds the molten material into a mold-set via a pump and a special nozzle arrangement. The reservoir is designed for gradual and very efficient melting of the raw material. This is achieved by using construction materials of different heat transfer coefficients and thickness and by controlling the temperature in several zones. This minimizes degradation of material and conserves energy. The reservoir is designed to be self-draining and easy to clean. The nozzle engages into a portion of the mold-set. The injection nozzle is fixed. A substantially "L" or "C" shaped structure allows for easy access to molded components and locates the mold halves. The structure also may serve as housing for the injection pump and mounting of the reservoir.

Obviously, numerous (additional) modifications and variations of the present invention are possible in light of the above teachings. It is, therefore, to be understood that within the scope of the appended claims, the invention may be practiced otherwise than as specifically described herein.

What is claimed is:

1. An apparatus for molding comprising:
   (A) a frame;
   (B) a melt reservoir attached to the frame, the melt reservoir being configured to hold molding material;
   (C) an injection unit attached to the frame in close relative proximity to the melt reservoir, the injection unit comprising:
      (a) a pump in fluid communication with the melt reservoir, the pump being configured to pomp molten molding material;
      (b) an injection nozzle coupled to the pump and positioned to be inserted into a mold, wherein the pump pumps molten molding material from the melt reservoir through the nozzle and into a mold; wherein the injection nozzle comprises a thermal barrier attached to the injection nozzle, wherein the thermal barrier is positioned between the injection nozzle and the mold when the injection nozzle is inserted into the mold.

2. The apparatus of claim 1 wherein the injection nozzle is configured to be in a fixed position with respect to the mold during the molding process.

3. The apparatus of claim 1 wherein the mold further comprises first and second mold sections and wherein the second mold section is moveable relative to the first mold section; further comprising a mold clamp configured to hold the first and second mold sections together while molten molding material is injected into the mold.

4. The apparatus of claim 3 wherein the mold clamp holds the first and second mold sections together at a first pressure until the mold sections are substantially closed and then holds the first and second mold sections together at a second clamping pressure once the mold sections are substantially closed; wherein the second pressure is greater than the first pressure.

5. The apparatus of claim 1 wherein the mold comprises first and second mold sections; further comprising a shuttle configured to exchange the second mold section with a third mold section configured to engage the first mold section.

6. The apparatus of claim 1 wherein the melt reservoir is self draining.

7. The apparatus of claim 1 wherein the apparatus does not contain a hose configured to transfer molten molding material from the melt reservoir to the injection unit.

8. The apparatus of claim 1 further comprising a motor that is thermally insulated from the melt reservoir; wherein the motor is configured to power the pump.

9. An apparatus for molding comprising:
   (A) a melt reservoir configured to store molding material;
   (B) an injection nozzle in fluid communication with the melt reservoir and positioned to be inserted into a mold;
   (C) a pump in fluid communication with the melt reservoir and configured to pump molten molding material through the injection nozzle and into the mold;
   (D) not containing a hose configured to transfer molten molding material from the melt reservoir to the injection nozzle; and
   (E) a thermal barrier attached to the injection nozzle and configured to thermally insulate the nozzle from the mold when molding material is injected into the mold.

10. The apparatus of claim 9 wherein the injection nozzle is configured to be in a fixed relationship relative to the mold when molten molding material is injected into the mold.

11. An apparatus for molding, comprising:
 (A) a melt reservoir, the melt reservoir being configured to bold molten molding material;
 (B) an injection nozzle in close relative proximity to the melt reservoir, to injection nozzle being configured to inject molten molding material;
 (C) a pump in direct fluid communication with the melt reservoir and the injection nozzle, the pump being configured to pump molten molding material from the reservoir through the nozzle; and
 (D) a pump manifold in fluid communication with the melt reservoir, the pump, and the injection nozzle.

12. The apparatus of claim 11, further comprising a controller box in communication with the melt reservoir; wherein the controller box is configured to control the temperature of the melt reservoir.

13. The apparatus of claim 11, further comprising at least one temperature sensing device in to melt reservoir.

14. The apparatus of claim 11, further comprising at least one heating element operability associated with the melt reservoir.

15. The apparatus of claim 11, further comprising a work area configured to allow an operator to prepare the apparatus for use and for working with molded objects formed by the apparatus.

16. The apparatus of claim 11, further comprising the mold.

17. The apparatus of claim 11 not comprising a base configured to transfer molten molding material from the melt reservoir to the injection nozzle.

18. An apparatus for molding comprising:
 (A) a frame;
 (B) a melt reservoir attached to the frame, the melt reservoir being configured to hold molding material;
 (C) an injection unit attached to the frame in close relative proximity to the melt reservoir, the injection unit comprising:
  (a) a gear pump in fluid communication with the melt reservoir, the gear pump being configured to pump molten molding material;
  (b) an injection nozzle coupled to the gear pump and positioned to be inserted into a mold, wherein the gear pump pumps molten molding material from the melt reservoir through the nozzle and into a mold.

19. The apparatus of claim 18 wherein the injection nozzle is configured to be in a fixed position with respect to the mold during the molding process.

20. The apparatus of claim 18 wherein the mold further comprises first and second mold sections and wherein the second mold section is moveable relative to the first mold section; further comprising a mold clamp configured to hold the first and second mold sections together while molten molding material is injected into the mold.

21. The apparatus of claim 20 wherein to mold clamp holds the first and second mold sections together at a first pressure until the mold sections are substantially closed and then holds the first and second mold sections together at a second clamping pressure ones the mold sections are substantially closed; wherein the second pressure is greater than the first pressure.

22. The apparatus of claim 20 wherein the mold comprises first and second mold sections; further comprising a shuttle configured to exchange the second mold section with a third mold section configured to engage to first mold section.

23. The apparatus of claim 18 wherein the melt reservoir is self draining.

24. The apparatus of claim 18 wherein the apparatus does not contain a hose configured to transfer molten molding material from the melt reservoir to the injection unit.

25. The apparatus of claim 18 further comprising a motor that is thermally insulated from the melt reservoir; wherein the motor is configured to power the gear pump.

26. An apparatus for molding comprising:
 (A) a frame;
 (B) a melt reservoir attached to the frame, the melt reservoir being configured to hold molding material;
 (C) an injection unit attached to the frame apart from, but in close relative proximity to, the melt reservoir, the injection unit comprising:
  (a) a pump in fluid communication with the melt reservoir, the pump being configured to pump molten molding material;
  (b) an injection nozzle coupled to the pump and positioned to be inserted into a mold, wherein the pump pumps molten molding material from the melt reservoir through the nozzle and into a mold.

27. The apparatus of claim 26 wherein the injection nozzle is configured to be in a fixed relationship relative to the mold when molten molding material is injected into the mold.

28. The apparatus of claim 26 further comprising a thermal barrier attached to the injection nozzle and configured to thermally insulate the nozzle from the mold when molding material is injected into the mold.

29. The apparatus of claim 26 wherein the mold further comprises first and second mold sections and wherein the second mold section is moveable relative to the first mold section; further comprising a mold clamp configured to hold the first and second mold sections together while molten molding material is injected into the mold.

30. The apparatus of claim 29 wherein the mold clamp holds the first and second mold sections together at a first pressure until the mold sections are substantially closed and then holds the first and second mold sections together at a second clamping pressure once the mold sections are substantially closed; wherein the second pressure is greater than the first pressure.

31. The apparatus of claim 26 wherein the mold comprises first and second mold sections; further comprising a shuttle configured to exchange the second mold section with a third mold section configured to engage the first mold section.

32. The apparatus of claim 26 wherein the melt reservoir is self draining.

33. The apparatus of claim 26 wherein the apparatus does not contain a hose configured to transfer molten molding material from the melt reservoir to the injection unit.

34. The apparatus of claim 26 further comprising a motor that is thermally insulated from the melt reservoir; wherein the motor is configured to power the pump.

35. The apparatus of claim 26 further comprising a controller box in communication with the melt reservoir; wherein the controller box is configured to control the temperature of the melt reservoir.

36. The apparatus of claim 26, further comprising at least one temperature sensing device in the melt reservoir.

37. The apparatus of claim 26, further comprising a work area configured to allow an operator to prepare the apparatus for use and for working with molded objects formed by the apparatus.

38. The apparatus of claim 26, further comprising the mold.

39. The apparatus of claim 26 wherein the pump comprises a gear pump.

* * * * *